United States Patent [19]

Jensen

[11] Patent Number: 5,555,573
[45] Date of Patent: Sep. 17, 1996

[54] TOILET FLUSHING DEVICE WITH WATER SAVING FEATURES

[75] Inventor: Robert M. Jensen, East Brunswick, N.J.

[73] Assignee: American Standard Inc., Piscataway, N.J.

[21] Appl. No.: 426,380

[22] Filed: Apr. 21, 1995

[51] Int. Cl.⁶ ........................................ E03D 1/14
[52] U.S. Cl. ................................................. 4/325
[58] Field of Search ........................ 4/324, 325, 405, 4/411–414

[56] References Cited

U.S. PATENT DOCUMENTS

| | | |
|---|---|---|
| 1,960,864 | 5/1934 | Brown . |
| 1,992,381 | 2/1935 | Lyons . |
| 2,001,390 | 5/1935 | Lester . |
| 2,183,677 | 12/1939 | Heath . |
| 2,532,977 | 12/1950 | White . |
| 2,731,647 | 1/1956 | Groth et al. . |
| 2,877,788 | 3/1959 | Clark . |
| 2,922,168 | 1/1960 | Crandall . |
| 3,787,902 | 1/1974 | McCombs . |
| 4,017,912 | 4/1977 | Young, Sr. . |
| 4,038,707 | 8/1977 | Cass . |
| 4,042,982 | 8/1977 | Contreras . |
| 4,096,591 | 6/1978 | Awis . |
| 4,134,165 | 1/1979 | Phripp, et al. . |
| 4,145,775 | 3/1979 | Butler . |
| 4,175,296 | 11/1979 | Goldman . |
| 4,240,167 | 12/1980 | Gilliland . |
| 4,391,003 | 7/1983 | Talerico et al. . |
| 4,406,024 | 7/1983 | Talerico et al. . |
| 4,411,029 | 10/1983 | Huang ........................ 4/325 X |
| 4,483,024 | 11/1984 | Troeh . |
| 4,485,501 | 12/1984 | Kloner . |
| 4,504,984 | 3/1985 | Burns . |
| 4,536,900 | 8/1985 | Hayes . |
| 4,620,331 | 11/1986 | Sagucio . |
| 4,651,359 | 3/1987 | Battle . |
| 4,748,699 | 6/1988 | Stevens . |
| 4,750,220 | 6/1988 | Baumann . |
| 4,764,995 | 8/1988 | Harney . |
| 4,811,432 | 3/1989 | Harris . |
| 4,817,216 | 4/1989 | Auman . |
| 4,825,478 | 5/1989 | Harris . |
| 4,837,867 | 6/1989 | Miller . |
| 4,864,665 | 9/1989 | Toltzman . |
| 4,881,279 | 11/1989 | Harney ........................ 4/325 X |
| 4,910,812 | 3/1990 | Comparetti . |
| 4,941,214 | 7/1990 | Harris . |
| 4,945,581 | 8/1990 | Harris . |
| 4,980,932 | 1/1991 | Stemples . |
| 5,020,167 | 6/1991 | Harris . |
| 5,075,907 | 12/1991 | Harris . |
| 5,341,520 | 8/1994 | Lazar . |
| 5,459,885 | 10/1995 | Gaw ........................ 4/325 |

Primary Examiner—Charles E. Phillips
Attorney, Agent, or Firm—Brown Raysman & Millstein

[57] ABSTRACT

A toilet flushing mechanism includes a dual flush device for effecting both a short flush cycle and a long flush cycle in a toilet tank including a flush valve actuated by an actuation arm. A cam operable by a handle is rotatably supported adjacent the actuation arm. When rotated in a first direction, the cam acts to press against and pivot the actuation arm to effect the long flush. When rotated in the second direction, the cam acts to press against and pivot said actuation arm to effect the short flush. A lever is pivotably supported with respect to the actuation arm and pivots between a first position out of blocking contact with the actuation arm and a second position where the lever blocks return of the actuation arm for a predetermined period of time when the cam is rotated in the second direction. A float is coupled to the lever for determining the predetermined period of time. The float acts to pivot the lever into the second position when the cam is rotated in the second direction.

21 Claims, 8 Drawing Sheets

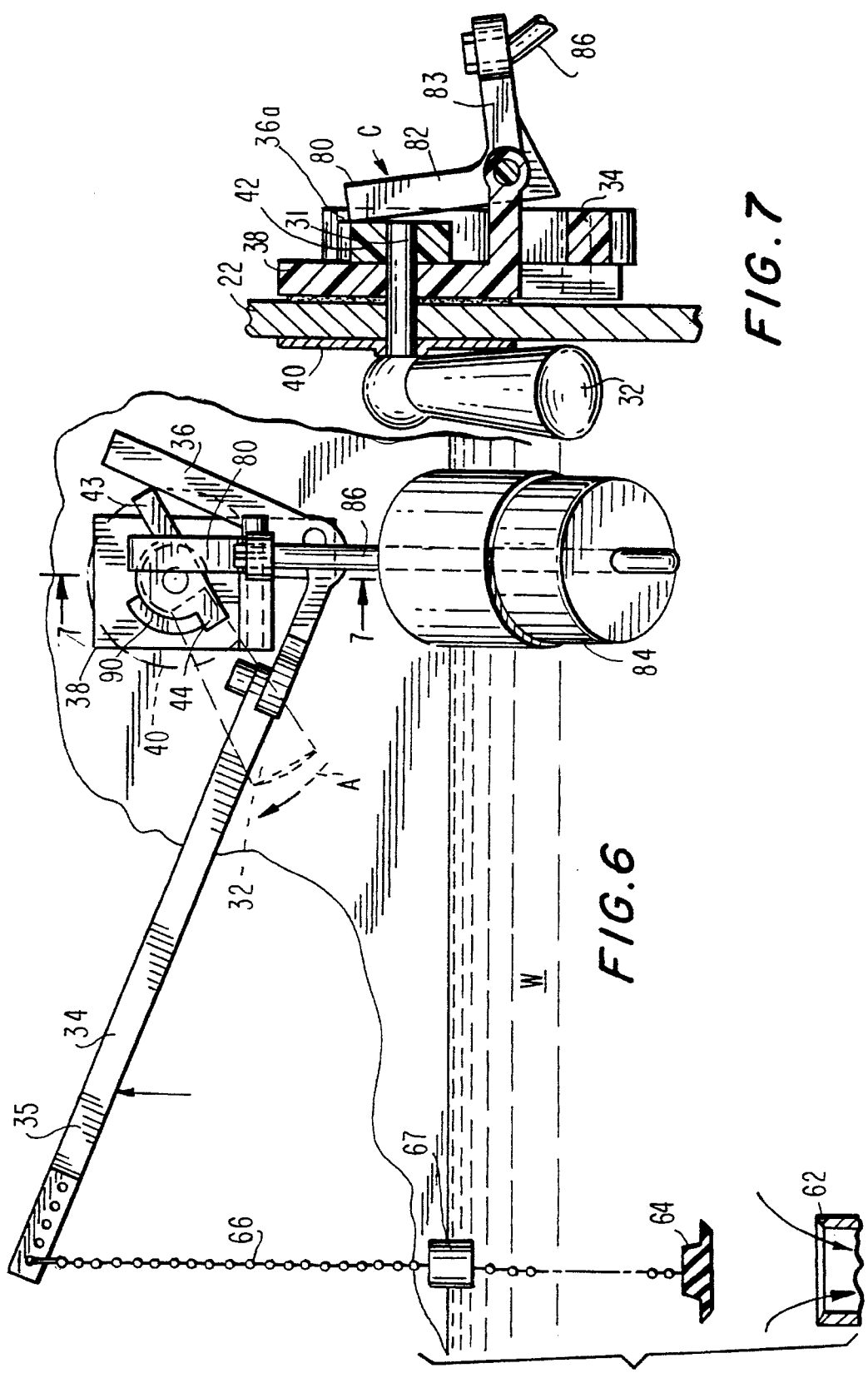

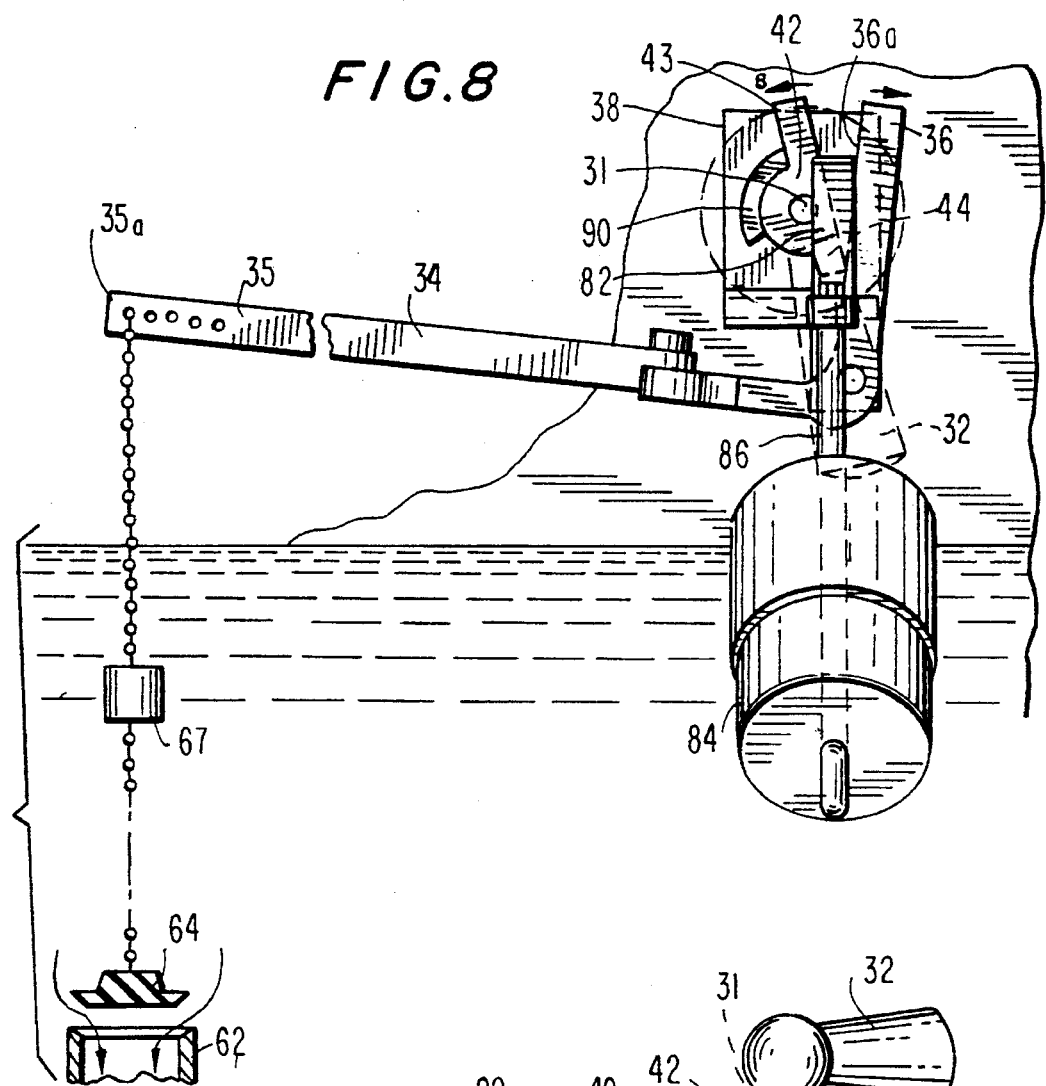
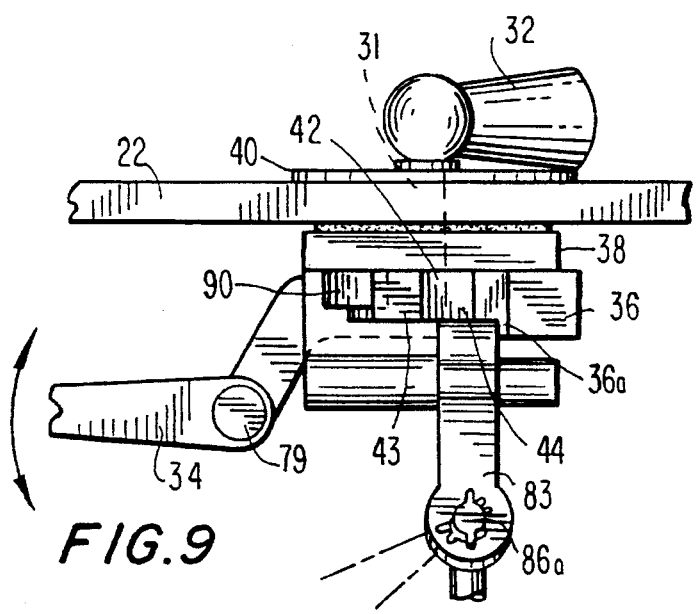

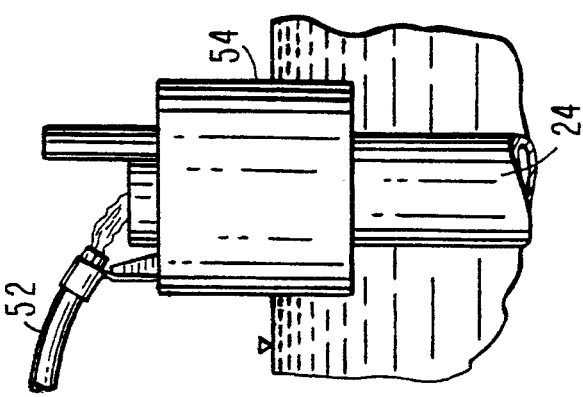
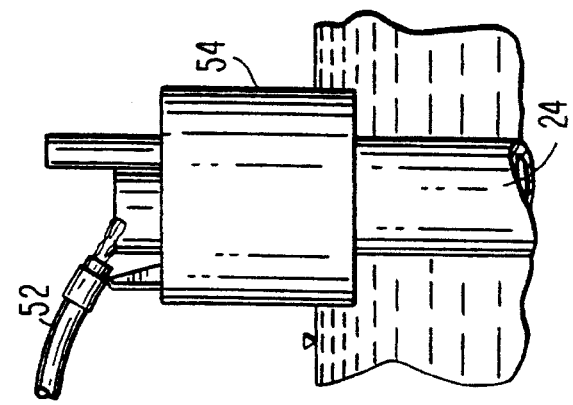
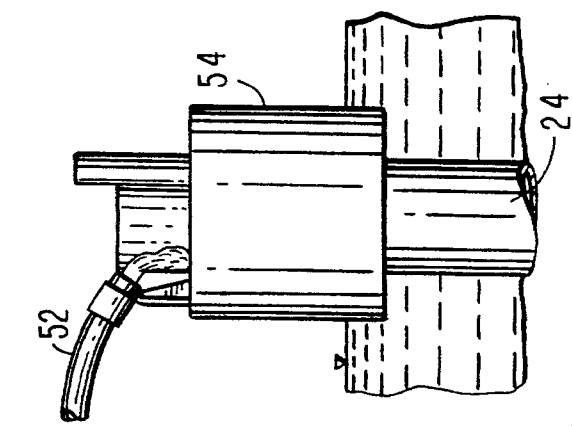
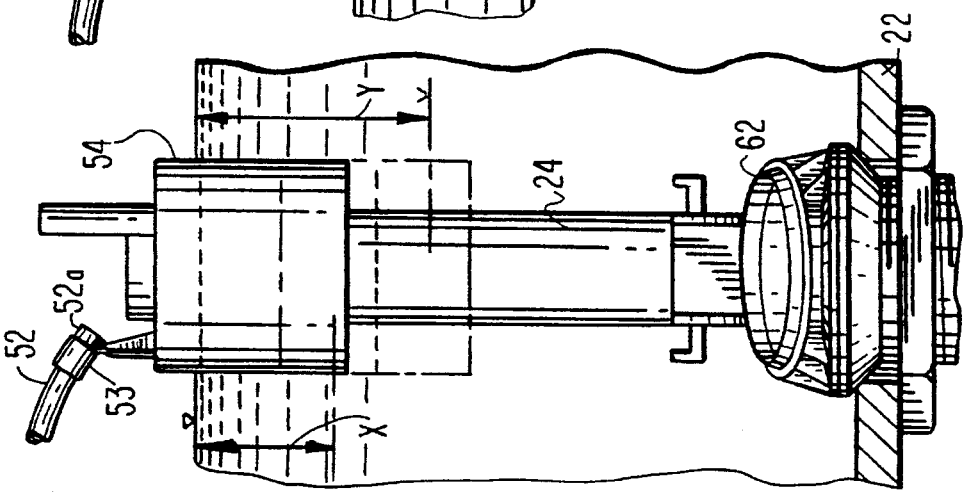
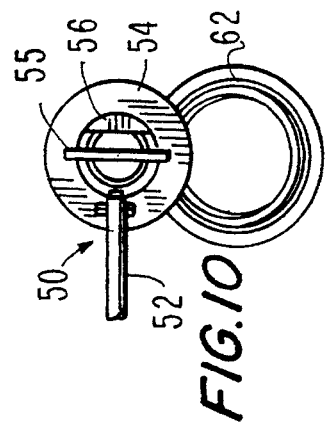

TOILET FLUSHING DEVICE WITH WATER SAVING FEATURES

BACKGROUND OF THE INVENTION

The present invention relates generally to a toilet flushing device with water saving features, and, in particular, to a toilet flushing device with a dual flush mechanism which uses a single handle and a single flush valve to effect both a short flush and a long flush. In addition, the present invention relates generally to a toilet trapway reseal device which selectively directs water from the reseal water hose into the tank overflow tube.

Various dual flush toilet mechanisms have been developed over the years for the purpose of providing the option of a full or long flush cycle for solid waste, or a short or partial flush cycle for liquid waste to save water during flushes that do not require the use of a full flush cycle. Conservation of natural resources such as water is important. Toilets which use less water to flush waste are most desirable.

Prior art dual flush mechanisms characteristically fall into two general categories. The first type of device includes dual flush mechanisms that utilize two separate flush valves. The flush valve used for the full flush is located at a lower level in the tank than the flush valve used for the short flush cycle. An example of this type of dual flush mechanism construction is found in Brown U.S. Pat. No. 1,960,864. Brown describes a dual flush valve operating device for a flush toilet wherein two trip lever arms of different lengths have a common fulcrum and are independently pivoted as the handle is rotated clockwise or counterclockwise.

The second type of dual flush mechanism characteristically includes two separate handles, one to effectuate the long flush and the other to effectuate the short flush. Activation of either handle causes a single flush valve in the tank to be raised to different heights. For example, Harney U.S. Pat. No. 4,881,279 describes a two-handle system wherein turning of the first handle results in a regular, full flush, and turning of the second handle results in a partial raising of the flush valve to actuate a short or partial flush. Harney uses a complicated system to effect the short flush cycle.

Lester U.S. Pat. No. 2,001,390 uses a clutch device on the rod of the flush valve to hold the flush valve in a partial raised position during the short flush cycle.

Most users are accustomed to a toilet with a single handle, and most toilets use a single flush valve as part of the toilet tank construction. Accordingly, an improved dual flush device for a toilet tank having a single flush valve actuated by a single handle for effecting either a short flush cycle or a long flush cycle is desired. It would also be desirable to provide such a dual flush device that can be retrofitted to a conventional toilet tank.

Another source of wasted water in a toilet tank occurs through the reseal water hose. After a toilet is flushed, the tank must be refilled with fresh water. In addition, some water must be supplied to the bowl or the trapway during refilling of the tank to insure that the trapway is resealed. In conventional toilets, the reseal water hose extends from the tank inlet water control and directs water into the tank overflow tube (which leads to the bowl or trapway) the entire time that the tank is refilling. This causes a waste of water since once the trapway is resealed, excess water will flow into the drain.

Furthermore, a dual flush device in the toilet tank complicates the water flow operation since two different refill patterns are required. Because the refill cycle after the long flush duration is greater than the short flush duration in a dual flush application, the volume of reseal water dedicated to insuring that the trapway in the toilet bowl is resealed after the long flush is typically greater than the volume of water dedicated to resealing the trapway during the short cycle. This may result in an underfilled trapway seal for the short flush which can create a health hazard. Yet, on the other hand, during the long flush, there is an overfilled trapway seal which wastes water that could have been better utilized, for example, for flushing solid waste and refilling the tank.

Prior art water reseal constructions have identified this problem of wasted water from the reseal hose and have attempted, in a less than completely satisfactory way, to provide a solution. For example, Lazar U.S. Pat. No. 5,341,520 describes a dual capacity toilet flusher where the end of the reseal hose is supported on a movable platform construction which selectively moves the refill hose horizontally away from the overflow tube when the bowl is refilling. Comparetti U.S. Pat. No. 4,910,812 describes a complicated toilet system wherein the overflow tube pivots out of the path of the reseal hose water during part of the flush cycle.

However, heretofore, an acceptable, reliable and simple reseal water hose assembly has not been provided which can permit the reseal water hose to direct water into the tank during part of the flushing cycle and thereafter permit the reseal water hose to direct water into the overflow tube to reseal the trapway, while providing the same amount of water during the long and short flush cycles.

Accordingly, an improved reseal water hose assembly that reduces unnecessary water consumption and assists in the filling of the toilet tank in order to effectuate a more efficient refill cycle is desired. In addition, a trapway reseal assembly that delivers an appropriate volume of reseal water to the trapway regardless of the flush cycle, and which can utilize the excess water flowing from the reseal hose by redirecting this water directly into the tank, is desired.

SUMMARY OF THE INVENTION

Generally speaking, in accordance with the present invention, a dual flush device for a toilet tank having a flush valve actuated by a pivotable actuation arm for effecting both a short flush cycle and a long flush cycle, is provided. The dual flush device includes a cam rotatably supported on the toilet tank adjacent the actuation arm. The cam, when rotated in a first direction, acts to press against and pivot the actuation arm to effect the long flush. When the cam is rotated in a second direction, the cam presses against and pivots the actuation arm to effect the short flush. The dual flush device also includes a lever pivotably supported with respect to the actuation arm between a first position out of blocking contact with the actuation arm and a second position where the lever blocks the actuation arm for a predetermined period of time when the cam is rotated in the second direction to hold the actuation arm in a partially raised position. A float is coupled to the lever for determining the predetermined period of time. The float acts to pivot the lever into the second position when the cam is rotated in the second direction.

In a preferred embodiment, the dual flush device includes a single handle for selectively rotating the cam in the first direction and the second direction.

According to another aspect of the present invention, a trapway reseal assembly is provided. A doughnut-shaped float rides along the overflow tube in the toilet tank with the changing water level in the tank. The end of a reseal water hose is supported on the float and selectively directs water into the overflow tube or the tank depending on the height of the float.

Accordingly, it is an object of the present invention to provide an improved toilet flushing device with water saving capabilities.

Another object of the present invention is to provide an improved dual flush device for use in a toilet tank that requires only a single flush valve actuated by a single handle for effecting both a short flush cycle and a long flush cycle.

Yet another object of the present invention is to provide an improved toilet construction that reduces unnecessary water consumption.

Still another object of the present invention is to provide an improved trapway resealing assembly.

Another object of the present invention is to provide an improved trapway resealing assembly for use in toilets with both a long flush cycle and a short flush cycle.

Yet another object of the present invention is to provide an improved trapway resealing assembly that reduces unnecessary water consumption and assists in the filling of the toilet tank in order to effectuate a more efficient refill cycle.

Still another object of the present invention is to provide an improved trapway resealing assembly that delivers an equal quantity of reseal water to the trapway regardless of the flush cycle and utilizes the unnecessary water flowing from the reseal tube by redirecting this water directly into the tank.

A still further object of the present invention is to provide a toilet flushing device with water saving features that can be retrofitted into a conventional toilet tank.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 6 is a rear elevational view of the dual flush mechanism in accordance with the present invention after the handle has been rotated to commence the long flush cycle;

FIG. 7 is a cross-sectional view taken along lines 7—7 of FIG. 6;

FIG. 8 is a rear elevational view of the dual flush mechanism in accordance with the present invention after the handle has been rotated to commence the short flush cycle;

FIG. 9 is a partial top plan view of the dual flush mechanism of FIG. 8;

FIG. 10 is a top plan view of the reseal water hose assembly constructed in accordance with a preferred embodiment of the present invention; and FIGS. 11 through 14 depict the reseal water hose operation during the long and short flush cycles in accordance with the present invention.

DETAILED DESCRIPTION OF THE PREFERRED EMBODIMENTS

Figure 1:
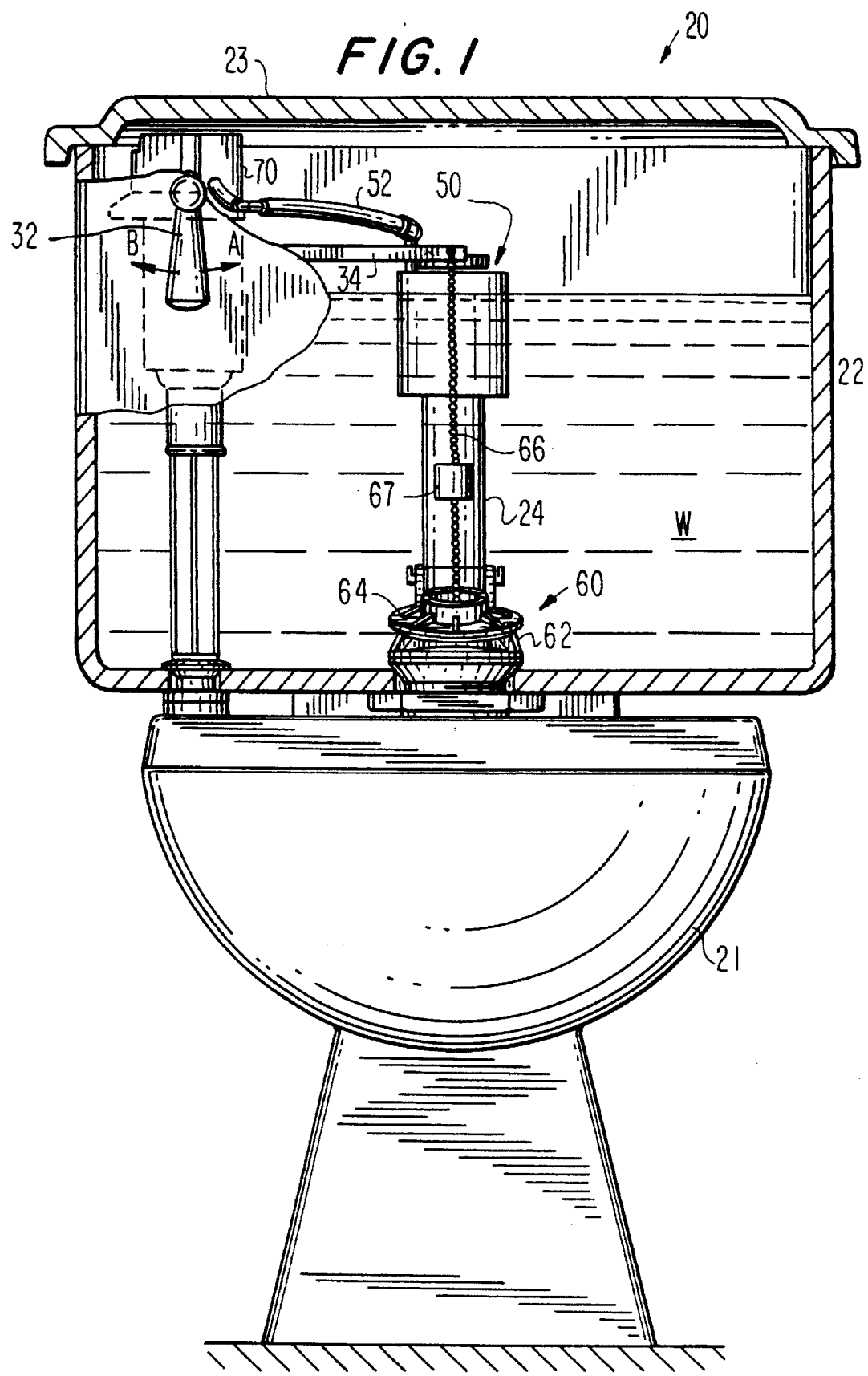
FIG. 1 is a front elevational view of a toilet with a toilet tank shown partially cut away having a dual flush mechanism and reseal water hose assembly constructed in accordance with a preferred embodiment of the present invention.
Figure 2:
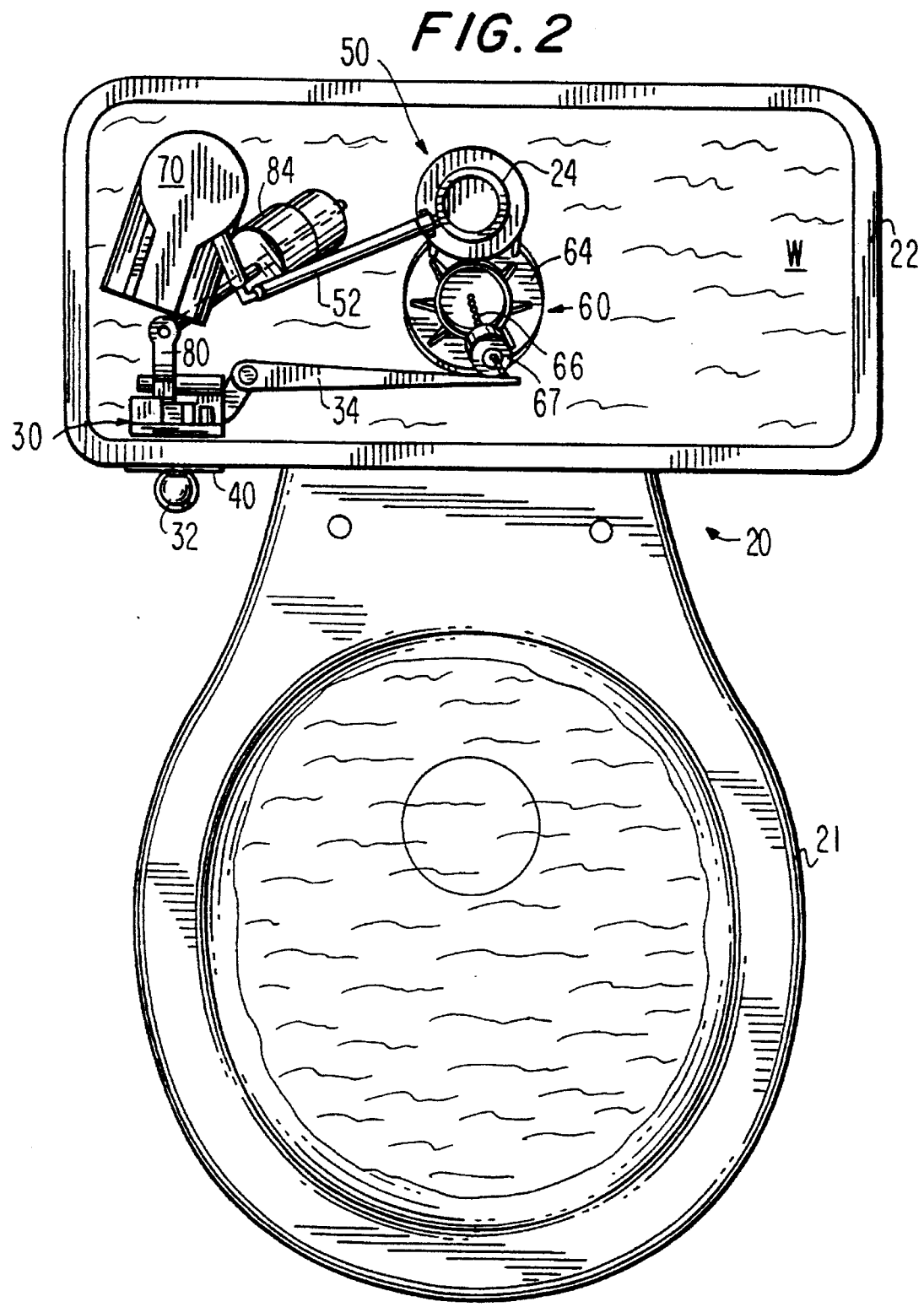
FIG. 2 is a top plan view of the toilet and tank of FIG. 1, with the tank cover removed.

Reference is first made to FIGS. 1 and 2 of the drawings which depict a toilet, generally indicated at 20, having a toilet bowl 21 and a toilet tank 22. Toilet tank 22 includes a removable tank cover 23. Toilet tank 22 also includes a dual flush mechanism, generally indicated at 30, and a trapway reseal assembly, generally indicated at 50, both constructed in accordance with the present invention.

A water inlet control assembly 70 is provided in the tank for controlling the refilling of toilet tank 22 with fresh water after flushing has occurred. Some fresh water is supplied to a water reseal hose 52 during refilling of the tank. Tank 22 includes an overflow tube 24 which leads to bowl 21 or directly to the toilet trapway below the toilet. Tank 22 also includes a flush valve, generally indicated at 60, which provides a conduit for water to flow from tank 22 to bowl 21 when the toilet is flushed. Flush valve 60 includes a valve seat 62 and a pivotable flush valve flapper 64 which opens and closes the valve.

Figure 3:
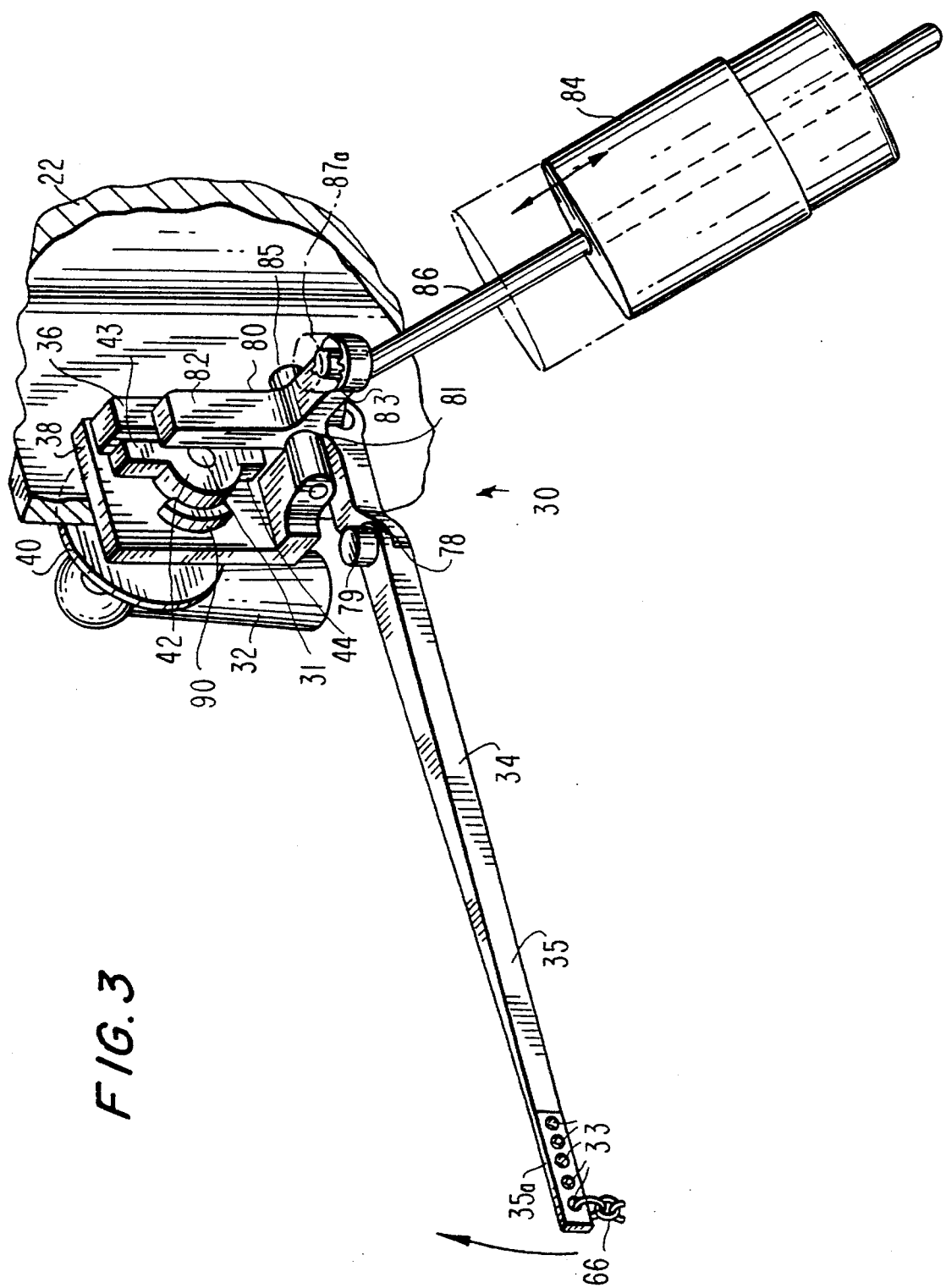
FIG. 3 is a rear perspective view of the dual flush mechanism constructed in accordance with a preferred embodiment of the present invention.
Figure 4:
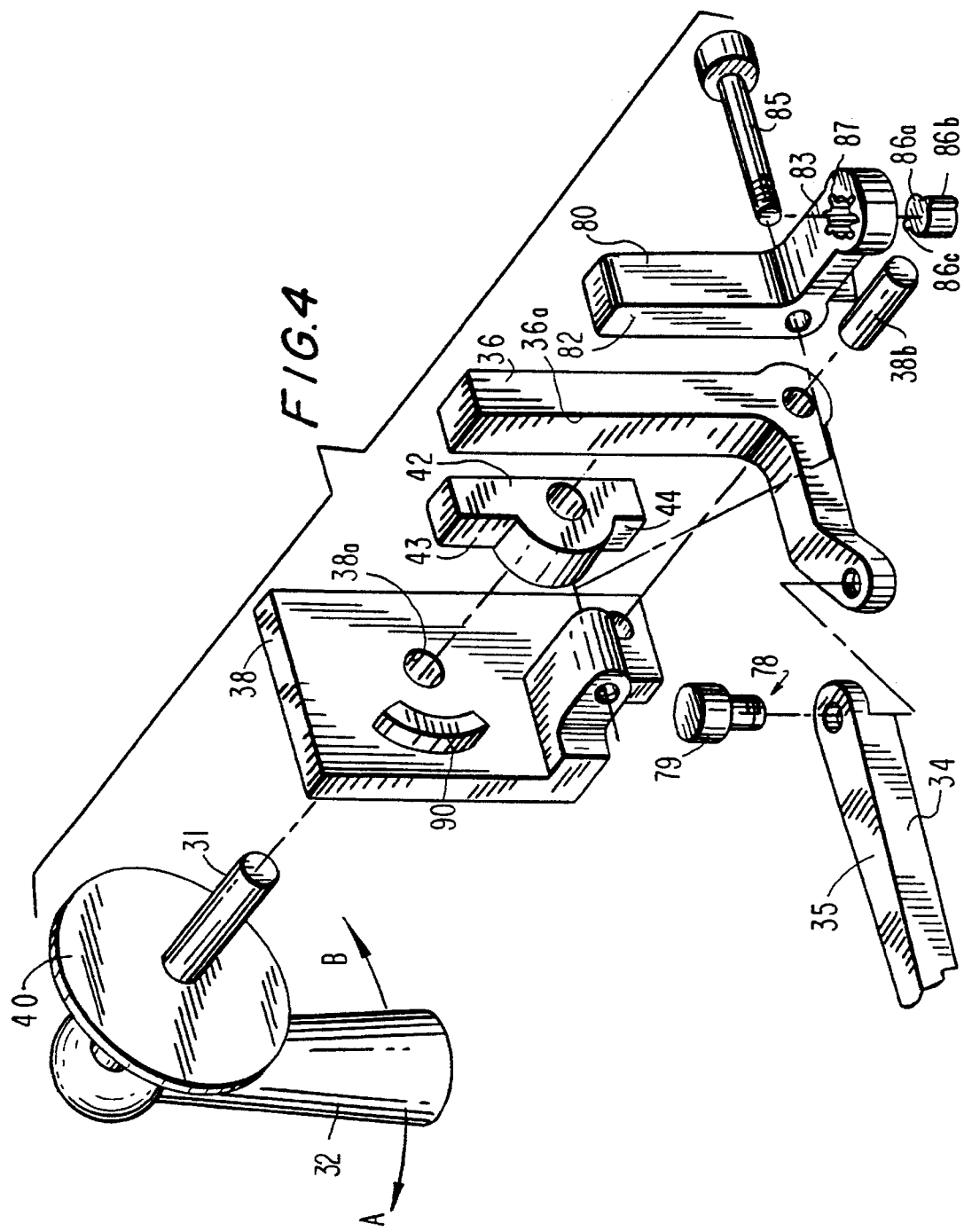
FIG. 4 is an exploded perspective view of the dual flush mechanism depicted in FIG. 3.

Reference is now made additionally to FIGS. 3 and 4 to describe the construction of dual flush mechanism 30. Dual flush mechanism 30, as described below in detail, is activated by a handle 32 on the outside of tank 22 which can be rotated in a counterclockwise direction in the direction of arrow A to effectuate a long or full flush cycle and in a clockwise direction in the direction of arrow B to effectuate a short or partial flush cycle.

Dual flush mechanism 30 includes an L-shaped pivotable actuation lever or arm 34 having a first arm 35 and a second arm 36. In a preferred embodiment, first arm 35 is longer than second arm 36. Free end 35a of first arm 35 of actuation lever 34 is coupled to flapper 64 of flush valve 60 through a chain or other flexible linkage 66. Free end 35a of first arm 35 may include several openings 33 spaced therealong to permit fastening of chain 66 thereto at a desired position. A separate flush valve float 67 is attached along chain 66 to hold flapper 64 open during the long flush cycle as described below in detail.

Dual flush mechanism 30 also includes a short flush lever 80 in the form of a pivotable L-shaped bellcrank. A partial flush float 84 is removably coupled to short flush lever 80 through a float rod 86, preferably using a threaded thumb nut 87, although other fastening devices can be used.

As can be seen, dual flush mechanism 30 may be mounted to toilet tank 22, preferably on a front wall thereof. Moreover, the exact position of the mounting can vary within reason, keeping in mind the importance of access to handle 32 and that dual flush mechanism 30 must not be mounted so as to cause interference with pre-existing structure in the conventional tank. In an exemplary embodiment, and as shown in FIG. 3, an opening is formed in the front wall of toilet tank 22 thereby permitting dual flush mechanism 30 to be mounted thereon by positioning the tank wall between a backing plate 38 and a threaded nut or other escutcheon 40. Backing plate 38 includes an opening 38a through which a shaft 31 which rotates with handle 32 extends. However, it is also contemplated that backing plate 38 may be formed as part of the inside wall of the toilet tank itself.

Handle 32 is coupled to dual flush mechanism 30 through shaft 31. A cam 42 in the form of an asymmetrical shoe having a first toe 43 and a second toe 44 is secured to shaft 31 using a screw or the like so as to be rotatable therewith. Cam 42 may be configured in alternate shapes such as a kidney bean shape, so long as cam 42 can operate to contact and lift actuation lever 34 when rotated clockwise and counterclockwise. However, it is noted that other forms of single handle actuation, such as different amounts of rotation, can be used to effectuate the different flush cycles.

In an exemplary embodiment, actuation lever 34 is pivotably supported by a pin 38b extending from backing plate 38. This mounting construction permits actuation lever 34 to be rotatable in a plane essentially parallel to backing plate 38. Arms 35 and 36 of actuation lever 34 may be constructed so as to be rigidly fixed together, or actuation lever 34 may be a unitary member. In addition, arm 35 may also be of a unitary member or may include a joint 78 which permits first arm 35 to be moveable horizontally with respect to second arm 36 to allow for different configurations. A pin 79, screw or the like is mounted as part of joint 78 to secure the sections of actuation lever 34 together.

It is noted that the dual flush mechanism of the present invention works best when free end 35a of arm 35 is positioned at least substantially over flush valve flapper 64. As described in greater detail below, when actuation lever 34 is raised, flush valve flapper 64 is pulled off of flush valve seat 62. Therefore, if free end 35a of arm 35 is positioned above lush valve flapper 64, flushing can be effectuated in a most efficient manner. By providing joint 78, first arm 35 can be rotated about joint 78 to position the free end of arm 35 as desired to avoid interference with other components in the tank.

Short flush lever 80 is pivotably coupled to backing plate 38 through a joint 81 using a dowel, screw or pin 85 or the like. Short flush lever 80 is pivotably coupled to backing plate 38 in a direction transverse to actuation lever 34. Short flush lever 80 includes two legs 82 and 83. Leg 83 is coupled to float rod 86. A partial flush float 84 may be slidably coupled to float rod 86 to permit accommodation in a pre-existing conventional toilet tank and to control the length of the short flush cycle. By permitting partial flush float 84 to be manually repositioned along float rod 86, the dual flush mechanism can be configured to operate in conventional toilets.

In addition, and as particularly shown in FIGS. 4 and 9, float rod 86 can be mounted to leg 83 in various orientations. In this regard, leg 83 has a star-shaped opening 87 to permit an end 86a of float rod 86 to be inserted therein in various positions. End 86a of float rod 86 may include wings 86b and 86c which are accommodated by hole 87. Once positioned, a thumb nut 87a can be used to hold the float rod in place.

A wall stop 90 is provided to prevent the over-rotation of cam 75 as discussed below.

Figure 5:
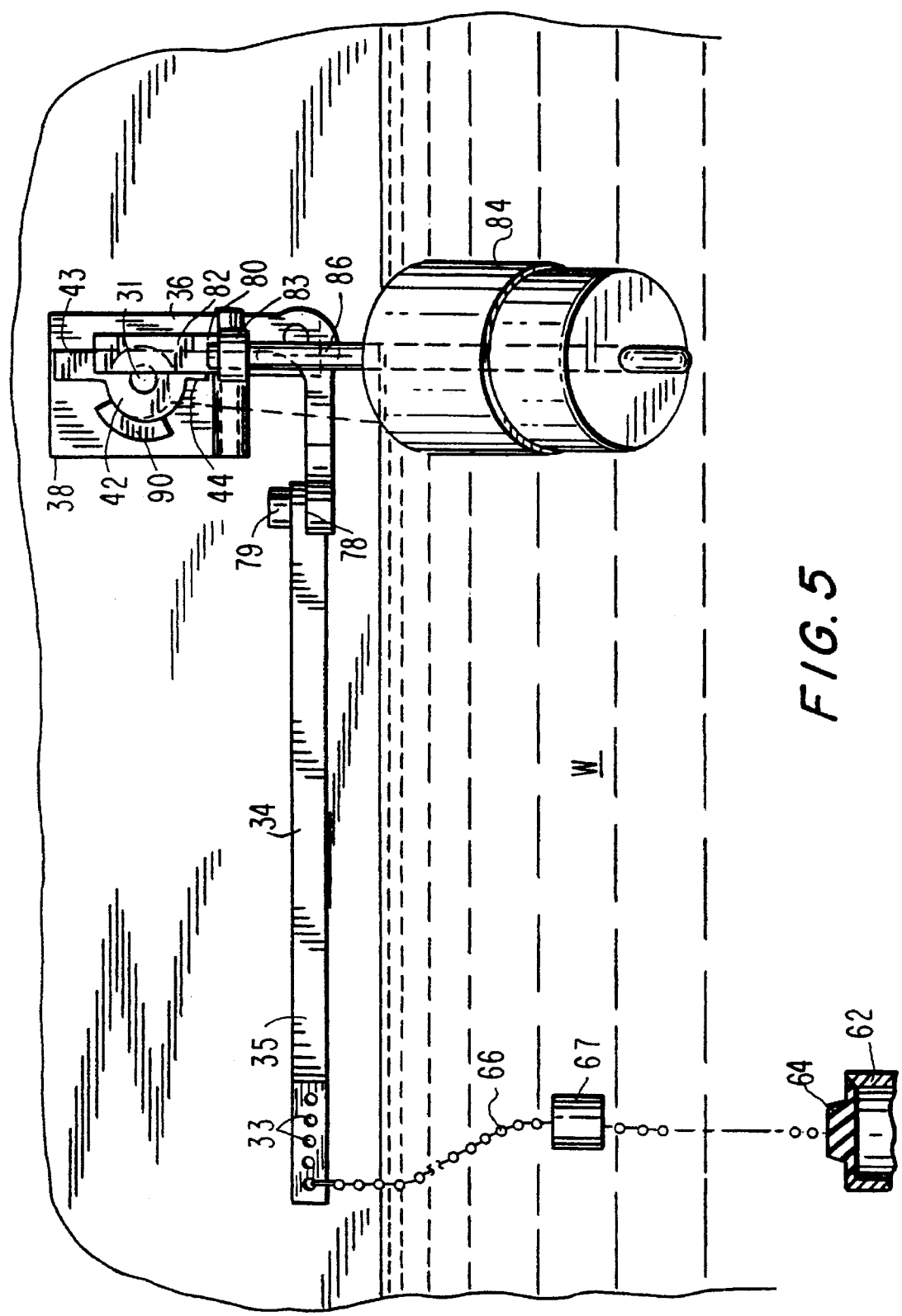
FIG. 5 is a rear elevational view of the dual flush mechanism in accordance with the present invention, shown prior to the commencement of a flush cycle.

As shown in FIGS. 3 and 5, which depict a pre-flush configuration when the tank is full, leg 82 of short flush lever 80 rests against second arm 36 of actuation lever 34 as float 84 tends to be lifted by the water level in the tank.

Reference is now made to FIGS. 5–7 to describe the operation of the dual flushing mechanism in accordance with the present invention to provide a long or full flush.

Such long or full flush is initiated by rotating handle 32 counterclockwise from the front in the direction of arrow A. This rotation of handle 32 causes shaft 31 to also rotate which in turn causes cam 42 to rotate in the same direction. This rotation causes the long toe 43 of cam 42 to contact an upper portion of second arm 36 of actuation lever 34 thereby raising first arm 35 which in turn pulls on chain 66 to raise flapper 64. Float 67 is accordingly pulled up to the lowering surface of the water W (FIG. 6). The angle through which actuation lever 34 can be rotated and the maximum height reached by arm 35 is limited by wall stop 90. Wall stop 90, shown in an arcuate shape by way of example only and not in a limiting sense, may be mounted to backing plate 38 or be formed integral therewith.

When handle 32 is rotated in the counterclockwise direction of arrow A (when viewed in FIG. 1), short toe 44 of cam 42 contacts the lower edge of wall stop 90 thereby preventing cam 42 and hence handle 32 from rotating any further. In this long or full flush condition, flush valve flapper 64 is shifted to its fully open or buoyant position thereby allowing the water in the tank to empty into the bowl to flush the bowl. As the water level in the tank drops, float 67 also lowers (but remains on the water surface). Actuation lever 34 also lowers to its original position. When the water level drops to a predetermined level, flush valve flapper 64 closes and reseals flush valve seat 62 in the conventional manner, thus terminating the full flush cycle. The tank then begins to refill.

As depicted in FIG. 3, in the pre-flush condition when the tank is full, leg 82 presses against the side of arm 36 of actuation lever 34 due to the buoyancy of flush float 84. As depicted in FIG. 7, when the long flush cycle begins, short flush lever 80 initially rotates towards handle 32 in the direction of arrow C and would appear to prevent actuation lever 34 from returning to its original position after the tank empties. However, it is to be understood that after the long flush cycle begins, the water level in the tank begins to fall as water in the tank is delivered through the flush valve to the bowl. The lowering of the water causes partial flush float 84 to also fall, thereby rotating short flush lever 80 away from handle 32 out of the path of arm 36 of actuation lever 34 before flush valve flapper 64 covers and seals flush valve seat 62. Therefore, it can be seen that the presence of the short flush lever 80 does not affect the long or full flush cycle.

Reference is now made to FIGS. 8–9 which illustrate the operation of the dual flushing mechanism of the present invention during the short flush cycle. A partial or short flush is initiated by rotating handle 32 in the clockwise direction of arrow B (as viewed in FIG. 1). The rotation of handle 32 rotates shaft 31 which causes short toe 44 of cam 42 to contact a lower portion of second arm 36 of actuation lever 34 thereby raising first arm 35 of actuation lever 34 to a second predetermined height, which is less than the predetermined height in the long flush.

The amount of rotation and height is also limited by wall stop 90. In the clockwise direction, toe 43 contacts the top of wall stop 90 to prevent the over-rotation of actuation lever 34. Accordingly, flush valve flapper 64 is not raised off of flush valve seat 62 as high as it is raised during the long full flush cycle operation. Moreover, since float 67 is not raised sufficiently to rise to the water surface, flush valve flapper 64 is held open only due to the tension of chain 66, rather than by the float buoyancy as in the full flush.

As soon as actuation lever 34 is raised, the buoyancy of partial flush float 84 causes leg 82 of short flush lever 80 to rotate towards handle 32 and press against the face of cam 42 as depicted in FIG. 9. When handle 32 is released, leg 82 of short flush lever 80 will contact the inner surface 36a of second arm 36 of actuation lever 34 so as to block further downward movement and maintain first arm 35 of actuation lever 34 in an elevated position allowing flush valve flapper 64 to be held in a partially open position permitting water to flow from the tank to the bowl.

However, after the commencement of the short flush cycle, the water level begins to fall. As the water level falls, partial flush float 84 lowers with the corresponding water level in the tank. At a predetermined water level, the partial flush float 84 will have fallen a sufficient distance to cause short flush lever 80 to rotate back, thus disengaging leg 82 from arm 36 of actuation lever 34, thereby permitting actuation lever 34 to rotate and lower which in turn permits flush valve flapper 64 to close and reseal, thereby terminating the partial or short flush cycle.

As water refills in the tank in the conventional manner, flush float 84 rises in the tank and leg 82 of short flush lever 80 rotates about its pivotal axis to reset itself for the next flush action.

By providing a dual flush mechanism which allows the user to select either a full or partial flush by selected rotation of a single handle to selectively activate a single flush valve, an improved dual flush mechanism that conserves water is provided. A full flush is obtained by the rotation of a single handle in the counterclockwise direction. This rotation causes the cam or shoe to contact an actuation arm, thereby lifting the flush valve from its seat. Upward movement of the actuation arm is limited by a stop.

For a partial flush, the handle is rotated in the clockwise direction. This rotation causes the cam to contact the actuation lever, but raises the actuation lever a lesser amount. Similarly, upward movement of the actuation arm is limited by the stop. Release of the handle allows the short flush lever to temporarily hold the actuation in a partial raised condition, thereby keeping the flush valve in an unseated position allowing water to flow from the tank to the bowl. As the water level in the tank drops, the partial flush float also drops disengaging the short flush lever from the actuation lever. This permits the actuation arm to return to its pre-flush position and reseat the flapper onto the flush valve seat. With the refilling of the tank, the partial flush float rises, rotating the short flush lever to contact the actuation lever in preparation for the next flush cycle.

Reference is now made particularly to FIGS. 10 through 14, which depicts trapway reseal assembly 50. Assembly 50 includes a reseal water hose 52 having a free end 52a which is coupled to a reseal float 54. In the preferred embodiment, reseal hose 52 is coupled to reseal float 54 by means of a clip 53 or the like. Reseal float 54 is preferably in the shape of a doughnut and slidably supported to ride along overflow tube 24. Overflow tube 24 may also include a retaining pin 55 (FIG. 10) which prevents reseal float 54 from disengaging from overflow tube 24. In addition, overflow tube 24 may include a splash guard 56 (FIG. 10) to assist in directing water flow from hose 52.

Reference is now made specifically to FIGS. 11 through 14 which illustrate the operation of trapway reseal assembly 50 in accordance with the present invention. In a pre-flush configuration when the tank is full, float 54 is in its uppermost position as shown in FIG. 11. At this position, free end 52a is positioned to direct water in overflow tube 24. However, no water is flowing in the pre-flush condition since the inlet valve of the water control is closed.

After a long or short flush cycle is commenced, as water in the tank empties into the toilet bowl, the reseal float begins to lower with the tank water level. Distance X shown in FIG. 11 shows the distance that the reseal float 54 drops during a short flush cycle, while distance Y show the drop distance for a long flush. Once float 54 drops to the level shown in FIG. 12, reseal hose 52 is below the rim of overflow tube 24 and water from the reseal hose will be directed into the tank.

As the tank refills after the flapper has closed, the reseal float will begin to rise. Water from hose 52 will continue to be directed into the tank until the float hits the level of FIG. 13 where water begins to be directed into the overflow tube. It is specifically noted that the point at which reseal water is first redirected into the overflow tube is the same after either flush cycle, thus ensuring the same quantity of reseal water dedicated to sealing the trapway. As the water continues to rise, reseal hose 52 is again directly over overflow tube 24 so as to cause water to flow directly into overflow tube 24 as shown in FIG. 14. Water will be directed into the overflow tube until the tank is full.

The trapway reseal assembly of the present invention provides for excess water from the reseal hose to be used for refilling the tank. In addition, essentially the same amount of water will be delivered through the overflow tube to the trapway regardless of the length of the flush.

By providing a trapway reseal assembly where the reseal hose is mounted on a float which rides along the overflow tube, an improved dual flushing toilet system that channels an equal volume of reseal water dedicated to sealing the trapway of the toilet is provided. Regardless of the flush cycle, by providing a trapway reseal assembly where water is directed by the position of a reseal float, which itself is positioned by the water level within the tank, an improved reseal assembly is provided.

It will thus be seen that the objects set forth above, and those made apparent from the preceding description are efficiently obtained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A dual flush device for use in a toilet tank having a flush valve supportable on a valve seat, said valve being actuated by a pivotable actuation arm for effecting both a short flush cycle and a long flush cycle, comprising a cam rotatably supported on said toilet tank adjacent said actuation arm, a handle for selectively rotating said cam in a first direction and in a second direction, opposite said first direction, said cam, when rotated in said first direction, pressing against said actuation arm to pivot said actuation arm to lift said flush valve a distance above said valve seat such that said valve will be fully open, to effect said long flush, said cam, when rotated in said second direction, pressing against said actuation arm to pivot said actuation arm to lift said flush valve a distance above said valve seat insufficient for said valve to become fully open, to effect said short flush, a lever pivotably supported with respect to said actuation arm between a first position where movement of said actuation arm is not blocked and a second position where said lever contacts said actuation arm for a predetermined period of time to partially block movement of said actuation arm when said cam is rotated in said second direction, and a float coupled to said lever for determining said predetermined period of time, said float pivoting said lever into said second position when said cam is rotated in said second direction.

2. The dual flush device as claimed in claim 1, wherein said actuation arm is L-shaped and includes first and second arms, said first arm being coupled to said flush valve, and said second arm being in selective contact with said cam.

3. The dual flush device as claimed in claim 2, wherein said first arm is adjustable with respect to said second arm.

4. The dual flush device as claimed in claim 1, wherein said cam is an asymmetrical shoe having a first toe and a second toe.

5. The dual flush device as claimed in claim 4, wherein said first toe contacts said actuation arm to effect said long flush, and said second toe contacts said actuation arm to effect said short flush.

6. The dual flush device as claimed in claim 5, further comprising stop means for preventing overrotation of said cam by said handle.

7. The dual flush device as claimed in claim 6, wherein said second toe contacts said stop means to prevent overrotation of said cam when said first toe contacts said actuation arm.

8. The dual flush device as claimed in claim 7, wherein said first toe contacts said stop means to prevent overrotation of said cam when said second toe contacts said actuation arm.

9. The dual flush device as claimed in claim 1, wherein said lever is L-shaped and includes a first leg and a second leg, said float being coupled to said second leg.

10. The dual flush device as claimed in claim 9, wherein said first leg of said lever blocks return of said actuation arm to its original position for said predetermined period of time.

11. The dual flush device as claimed in claim 10, wherein said float includes an elongated rod on which said float is supported, said float being selectively positionable along said elongated rod.

12. The dual flush device as claimed in claim 9, wherein said float includes an elongated rod on which said float is supported, said rod being coupleable to said second leg in at least two different orientations.

13. The dual flush device as claimed in claim 12, wherein said second leg includes a star shaped opening, said rod having an end which is selectively positionable in said opening.

14. The dual flush device as claimed in claim 1, wherein said actuation arm includes a free end, further comprising a linkage between said free end of said actuation arm and said flush valve.

15. A dual flush device for a toilet tank, said toilet tank including a flush valve, said dual flush device being actuated by the movement of a handle for effecting both a short flush cycle and a long flush cycle, comprising:

a support member;

a pivotable actuation arm pivotally supported on said support member and coupleable to said flush valve for starting both said short flush cycle and said long flush cycle;

a cam rotatably supported on said support member;

actuation means for selectively rotating said cam in a first direction to assume a first position and a second direction opposite to said first direction to assume a second position;

said cam when rotated to said first position acting to press against and pivot said actuation arm to lift said valve to effect said long flush;

said cam when rotated to said second position acting to press against and pivot said actuation arm to lift said valve to effect said short flush;

a lever supported on said support member and pivotable between a first orientation and a second orientation where said lever engages said actuation arm for a predetermined period of time when said cam is rotated in said second direction to restrict pivoting of said actuation arm;

and a float coupled to said lever for determining said predetermined period of time, said float acting to pivot said lever into said second orientation when said cam is rotated to said second position.

16. The dual flush device as claimed in claim 15, wherein said actuation means includes a handle for selectively rotating said cam to said first and second positions.

17. The dual flush device as claimed in claim 15, wherein said actuation arm includes a joint for selectively positioning said actuation arm in said toilet tank.

18. The dual flush device as claimed in claim 15, wherein said float is selectively positionable with respect to said lever.

19. The dual flush device as claimed in claim 15, further including stop means on said support member for limiting said cam from overrotating beyond said first and second positions.

20. The dual flush device as claimed in claim 19, wherein said stop means is an arcuate projection.

21. A dual flush device for a toilet tank, said toilet tank including a displaceable flush valve, said dual flush device being actuatable by the rotation of a handle for effecting both a short flush cycle and a long flush cycle, comprising:

a pivotable actuation lever having a first arm and a second arm;

a cam positioned adjacent said actuation lever and rotatable in a first direction and a second direction;

a short flush lever having a first leg and a second leg pivotably supported with respect to said actuation lever;

a float coupled to said second leg of said short flush lever for biasing said short flush lever in a first position and a second position where said first leg of said short flush lever engages said second arm of said actuation lever to temporarily limit the movement thereof;

movement of said cam in said first direction causing said cam to press against said second arm at a first location therealong to raise said first arm to a first height to displace said flush valve for a first predetermined period of time;

movement of said cam in said second direction causing said cam to press against said second arm at a second location therealong to raise said first arm to a second height and permitting said first leg of said short flush lever to move into the path of said second arm to temporarily inhibit the downward rotation of said actuation arm.

* * * * *